United States Patent
Nguyen

(10) Patent No.: US 10,075,646 B2
(45) Date of Patent: Sep. 11, 2018

(54) SENSOR SYSTEMS AND METHODS

(71) Applicant: Sensors Unlimited, Inc., Princeton, NJ (US)

(72) Inventor: Thuc-Uyen Nguyen, Princeton, NJ (US)

(73) Assignee: Sensors Unlimited, Inc., Princeton, NJ (US)

( * ) Notice: Subject to any disclaimer, the term of this patent is extended or adjusted under 35 U.S.C. 154(b) by 254 days.

(21) Appl. No.: 14/954,955

(22) Filed: Nov. 30, 2015

(65) Prior Publication Data

US 2017/0155848 A1    Jun. 1, 2017

(51) Int. Cl.
| | |
|---|---|
| H04N 5/33 | (2006.01) |
| H04N 5/232 | (2006.01) |
| H04N 5/225 | (2006.01) |
| G02B 27/10 | (2006.01) |
| G02B 27/28 | (2006.01) |

(52) U.S. Cl.
CPC ....... *H04N 5/23293* (2013.01); *G02B 27/106* (2013.01); *G02B 27/283* (2013.01); *H04N 5/2252* (2013.01); *H04N 5/2254* (2013.01); *H04N 5/23229* (2013.01); *H04N 5/332* (2013.01)

(58) Field of Classification Search
None
See application file for complete search history.

(56) References Cited

U.S. PATENT DOCUMENTS

| | | |
|---|---|---|
| 5,035,472 A | 7/1991 | Hansen |
| 5,165,079 A | 11/1992 | Schulz-Hennig |
| 5,535,052 A | 7/1996 | Jorgens |
| 5,689,354 A | 11/1997 | Orino |
| 6,061,182 A | 5/2000 | Carmeli et al. |
| 6,781,127 B1 | 8/2004 | Wolff et al. |
| 6,909,539 B2 | 6/2005 | Korniski et al. |
| 6,999,231 B2 | 2/2006 | Bryant |
| 7,248,401 B2 | 7/2007 | Bryant |
| 7,290,882 B2 | 11/2007 | Collins et al. |
| 7,306,338 B2 | 12/2007 | Hansen et al. |
| 7,483,213 B2 | 1/2009 | Pochapsky |
| 8,079,713 B2 | 12/2011 | Ashkenazi |
| 8,184,375 B2 | 5/2012 | Towndrow et al. |
| 8,755,123 B2 | 6/2014 | Heimer |
| 2009/0290149 A1 | 11/2009 | Roth |
| 2013/0063629 A1 | 3/2013 | Webster et al. |
| 2013/0333266 A1* | 12/2013 | Gose ................. F41G 1/00 42/111 |
| 2015/0271380 A1* | 9/2015 | Darty .................. G01J 3/0294 348/342 |
| 2017/0155873 A1 | 6/2017 | Nguyen |

\* cited by examiner

*Primary Examiner* — James M Anderson, II
(74) *Attorney, Agent, or Firm* — Locke Lord LLP; Scott D. Wofsy; Alicia J. Carroll

(57) ABSTRACT

An imaging system includes a housing having a lens that defines a first optical axis. A sensor is within the housing offset from the first optical axis. A digital display is within the housing offset from the first optical axis opposite from the sensor across the first optical axis. A second optical axis is defined between the sensor and the digital display. A polarized beam splitter is within the housing at an intersection of the first and second optical axes to allow a portion of incoming photons to pass and continue along the first optical axis for direct-eye viewing and to redirect another portion of incoming photons to the sensor along the second optical axis.

7 Claims, 1 Drawing Sheet

SENSOR SYSTEMS AND METHODS

BACKGROUND OF THE INVENTION

1. Field of the Invention

The present invention relates to sensor systems, and, in particular, to imaging systems with direct eye viewing.

2. Description of Related Art

Traditional imaging systems are used for vision enhancement, e.g. vision enhancement in low light conditions. Imaging systems, such as those in handheld devices, typically have a single sensor configured to generate an image based off of a single spectral band from a single field of view. When it is desired to generate an image from multiple spectral bands, or have direct eye viewing, multiple sensors paired with respective apertures, and displays may be required to capture each desired spectral band, which can present challenges. This can be challenging in applications where compactness is important. In addition, multiple-aperture systems pose imaging and post-processing challenges due to parallax issues.

Such conventional methods and systems have generally been considered satisfactory for their intended purpose. However, there is still a need in the art for systems and methods that allow for improved imaging systems and vision enhancement. The present invention provides a solution for these problems.

SUMMARY OF THE INVENTION

An imaging system includes a housing having a lens that defines a first optical axis. A sensor is within the housing offset from the first optical axis. A digital display is within the housing offset from the first optical axis opposite from the sensor across the first optical axis. A second optical axis is defined between the sensor and the digital display. A polarized beam splitter is within the housing at an intersection of the first and second optical axes to allow a portion of incoming photons to pass and continue along the first optical axis for direct-eye viewing and to redirect another portion of incoming photons to the sensor along the second optical axis.

In accordance with some embodiments, the polarized beam splitter is angled relative to the first and second optical axes. The sensor can be operatively connected to the digital display to provide an image to be emitted from the digital display. The polarized beam splitter can include a polarized surface oriented to face toward the digital display to reflect an image emitted from the digital display from the second optical axis to the first optical axis for direct-eye viewing. The sensor can be a short-wavelength infrared (SWIR) band sensor, a near infrared (NIR) band sensor, a long-wavelength infrared (LWIR) band sensor, and/or a medium-wavelength infrared (MWIR) band sensor.

In accordance with another aspect, a method for directing photons in an imaging system includes receiving photons through a lens in a housing. The lens defines a first optical axis. The method includes passing a first portion of the photons through a beam splitter for direct-eye viewing. The method includes reflecting a second portion of the photons along a second optical axis to a sensor using the beam splitter and generating an image based on the second portion of the photons collected with the sensor. The method includes emitting the image from a digital display toward the beam splitter along the second optical axis. The digital display is operatively connected to the sensor and oriented opposite of the sensor across the first optical axis. The method includes reflecting the image with the beam splitter from the second optical axis to the first optical axis for direct-eye viewing.

In accordance with some embodiments, the beam splitter is a polarized beam splitter. The method can include optically blending the image emitted from the digital display with the first portion of the photons for direct-eye viewing. The image and the first portion of the photons are from an overlapping field of view. The method can include providing the image to the digital display from the sensor.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
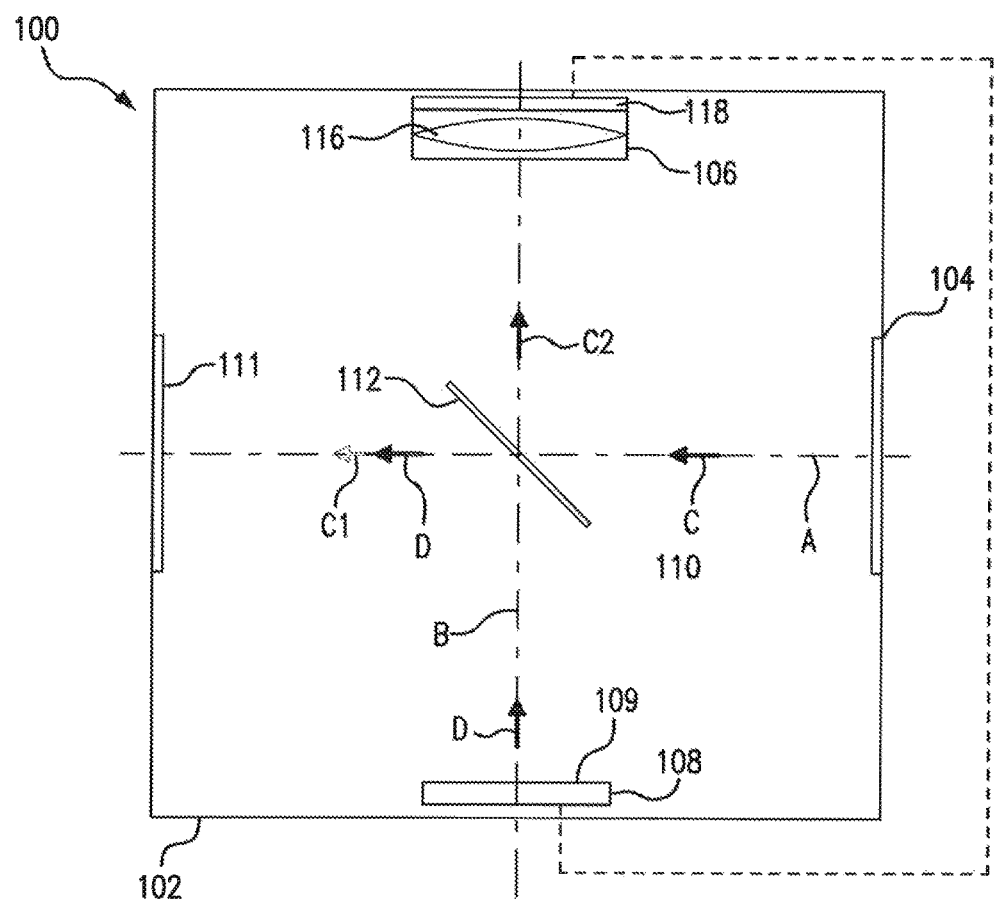
FIG. 1 is a top view of a schematic depiction of an exemplary embodiment of an imaging system constructed in accordance with the present disclosure, showing a direct optical path between a lens and an opening for direct-eye viewing.

Reference will now be made to the drawings wherein like reference numerals identify similar structural features or aspects of the subject disclosure. For purposes of explanation and illustration, and not limitation, a perspective view of an exemplary embodiment of an imaging system in accordance with the disclosure is shown in FIG. 1 and is designated generally by reference character 100. Other embodiments of imaging systems in accordance with the disclosure, or aspects thereof, are provided in FIG. 2, as will be described.

As shown in FIG. 1, an imaging system 100 includes a housing 102 having a lens 104 that defines a first optical axis A. A sensor 106 is within housing 102 offset from first optical axis A. A digital display 108 is within housing 102 offset from first optical axis A opposite from sensor 106 across first optical axis A. A second optical axis B is defined between sensor 106 and digital display 108. First and second optical axes, A and B, respectively, are perpendicular to one another. It is contemplated that sensor 106 includes a filter 116 and a focal plane array (FPA) 118. Depending on filter 116 and FPA 118, sensor 106 can be any one of a short-wavelength infrared (SWIR) band sensor, a near infrared (NIR) band sensor, a long-wavelength infrared (LWIR) band sensor, a medium-wavelength infrared (MWIR) band sensor, or any other sensor whose imaging can aid/enhance direct human vision.

With continued reference to FIG. 1, a polarized beam splitter 110 is within housing 102 at an intersection of first and second optical axes, A and B, respectively. Incoming photons traveling from lens 104 along first optical axis A toward beam splitter 110 are indicated schematically by arrow C. Beam splitter 110 allows a first portion of incoming photons, e.g. those in a visible spectrum, shown schematically by arrow C1, to pass and continue along first optical axis A to another lens or opening 111 for direct-eye viewing, and redirects a second portion of incoming photons, indicated schematically by arrow C2, to sensor 106 along second optical axis B. Polarized beam splitter 110 is angled relative to first and second optical axes, A and B, respectively. Sensor 106 is operatively connected to digital display 108 to provide an image in a visible spectrum, indicated schematically by arrow D, to be emitted from digital display 108. It is contemplated that digital display 108 can include a polarized monitor 109. Polarized beam splitter 110 includes a polarized surface 112 oriented to face toward digital display 108 to reflect the image emitted from digital display 108 from second optical axis B to first optical axis A for direct-eye viewing through opening 111 along with the portion of incoming photons in a visible spectrum, shown schematically by arrow C1, resulting in an optically blended image from the same field of view. Optically blending the portion of incoming photons in the visible spectrum, shown schematically by arrow C1, and the image emitted from digital display 108 reduces size, weight and power consumption of system 100 as compared with traditional digitally blended systems.

Figure 2:
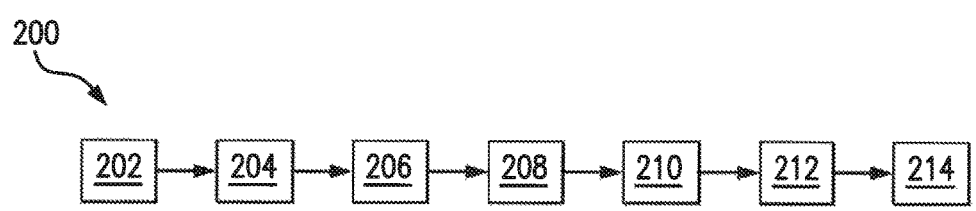
FIG. 2 is a flow chart schematically showing a method for directing photons in the imaging system of FIG. 1.

As shown in FIG. 2, a method 200 for directing photons in an imaging system, e.g. imaging system 100, includes receiving photons through a lens, e.g. lens 104, in a housing, e.g. housing 102, as shown by box 202. Method 200 includes passing a first portion of the photons through a beam splitter, e.g. beam splitter 110, for direct-eye viewing, as shown by box 204. Method 200 includes reflecting a second portion of the photons along a second optical axis, e.g. second optical axis B, to a sensor, e.g. sensor 106, using the beam splitter, as shown by box 206. Method 200 includes generating an image, e.g. the image indicated schematically by arrow 1), based on the second portion of the photons collected with the sensor, as shown by box 208. Method 200 includes providing the image to a digital display, e.g. digital display 108, from the sensor, as shown by box 210.

With continued reference to FIG. 2, method 200 includes emitting the image from the digital display toward the beam splitter along the second optical axis, as shown by box 212. Method 200 includes reflecting the image with the beam splitter from the second optical axis to the first optical axis and optically blending the image emitted from the digital display with the first portion of the photons for direct-eye viewing, as indicated by box 214. The image and the first portion of the photons are from an overlapping field of view, e.g. the same field of view.

System 100 provides a direct path for light in the visible spectrum to pass from lens 104 to an opening 111 for direct-eye viewing, while the remaining light from that same field of view, e.g. the second portion of the incoming photons, is directed to sensor 106 that generates an image that is then displayed through digital display 108, reflected by beam splitter 110 and optically blended with the visible light initially passed through beam splitter 110. This reduces processing typically required in traditional systems that utilize a sensor with a different or non-overlapping field of view. It is contemplated that the image or images formed can be used in a monitoring system, e.g. a security monitoring system, optical instruments, e.g. binoculars, or optionally be displayed on a display, e.g. a display found in a vehicle, or in any other suitable application.

The methods and systems of the present disclosure, as described above and shown in the drawings, provide for imaging systems with superior properties including improved uniformity, reduced processing, and compact size. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. An imaging system comprising:
   a housing having a lens defining a first optical axis;
   a sensor within the housing offset from the first optical axis;
   a digital display within the housing offset from the first optical axis opposite from the sensor across the first optical axis, wherein a second optical axis is defined between the sensor and the digital display; and
   a polarized beam splitter within the housing at an intersection of the first and second optical axes to allow a portion of incoming photons to pass and continue along the first optical axis for direct-eye viewing and to redirect another portion of incoming photons to the sensor along the second optical axis, wherein the sensor is operatively connected to the digital display to provide an image to be emitted from the digital display, wherein the polarized beam splitter includes a polarized surface oriented to face toward the digital display to reflect an image emitted from the digital display from the second optical axis to the first optical axis for direct-eye viewing.

2. The imaging system as recited in claim 1, wherein the polarized beam splitter is angled relative to the first and second optical axes.

3. The imaging system as recited in claim 1, wherein the sensor is at least one of a short-wavelength infrared (SWIR) band sensor, a near infrared (NIR) band sensor, a long-wavelength infrared (LWIR) band sensor, or a medium-wavelength infrared (MWIR) band sensor.

4. The imaging system as recited in claim 1, wherein the first and second optical axes are perpendicular to one another.

5. A method for directing photons in an imaging system comprising:
   receiving photons through a lens in a housing, wherein the lens defines a first optical axis;
   passing a first portion of the photons through a polarized beam splitter for direct-eye viewing;
   reflecting a second portion of the photons along a second optical axis to a sensor using the polarized beam splitter;
   generating an image based on the second portion of the photons collected with the sensor;
   providing the image to the digital display from the sensor;
   emitting the image from a digital display toward the polarized beam splitter along the second optical axis, wherein the digital display is operatively connected to the sensor and oriented opposite of the sensor across the first optical axis;
   reflecting the image with a polarized surface of the polarized beam splitter from the second optical axis to the first optical axis for direct-eye viewing, wherein the polarized surface is oriented to face toward the digital display.

6. The method as recited in claim 5, further comprising optically blending the image emitted from the digital display with the first portion of the photons for direct-eye viewing, where the image and the first portion of the photons are from an overlapping field of view.

7. The method as recited in claim 5, wherein the sensor is at least one of a SWIR band sensor, a NIR band sensor, a LWIR band sensor, or a MWIR band sensor.

* * * * *